United States Patent Office 3,511,753
Patented May 12, 1970

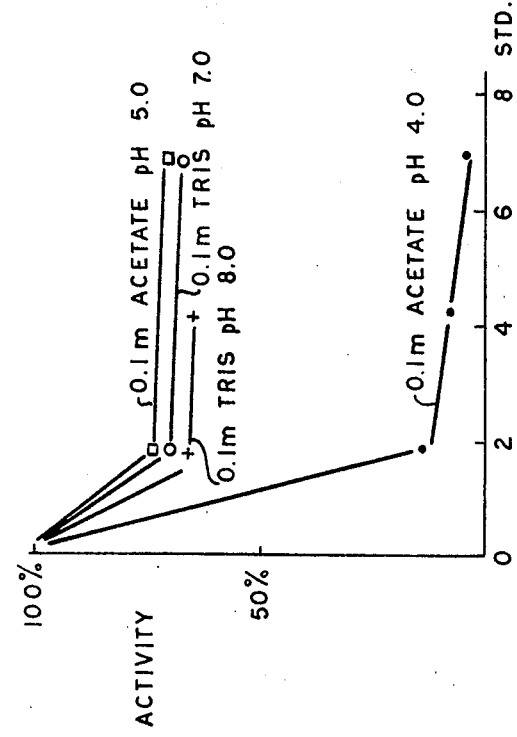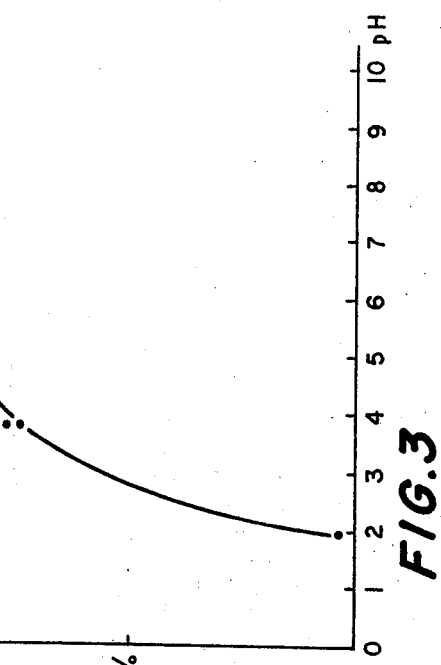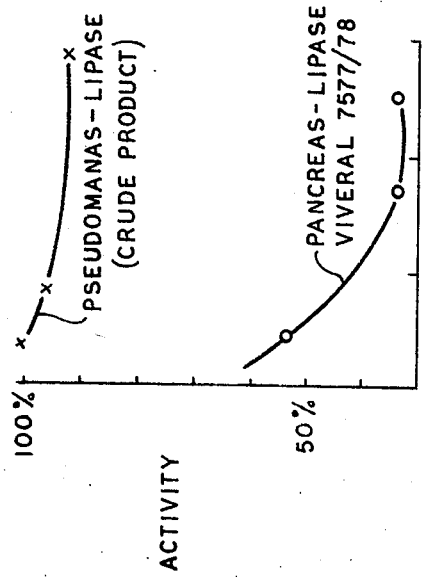

3,511,753
PROCESS FOR PREPARING A LIPOLYTIC ENZYME
Paul Prave, Hofheim, Taunus, and Hans-Dieter Summ, Kriftel, Taunus, Germany, assignors to Farbwerke Hoechst Aktiengesellschaft vormals Meister Lucius & Bruning, Frankfurt am Main, Germany, a corporation of Germany
Filed Aug. 17, 1966, Ser. No. 573,066
Claims priority, application Germany, Aug. 19, 1965, F 46,933
Int. Cl. C07g 7/02; C12d 13/10
U.S. Cl. 195—62    9 Claims

ABSTRACT OF THE DISCLOSURE

Method of producing a lipolytic enzyme by cultivating Pseudomonaceae in a nutrient medium containing a carboxylic or sulfonic acid derivative, a xanthogenate, or a higher carboxylic acid. A lipolytic enzyme produced in this manner.

---

Lipolytically active enzymes, also called lipases, are present in many animal tissues and are important in the metabolism both of human beings and animals as digestive enzymes, on account of their capability of splitting fats hydrolytically. It is for this reason that purified lipases are generally used in veterinary and human medicines as components of preparations which are administered against indigestion. In many cases, however, it is difficult to prepare lipases from animal tissues, because the organs particularly rich in enzymes are mostly used for other purposes—pancreas glands, for example, are used for the production of insulin—and thus are not available as lipase donors. Considerable progress would be made if lipase could be obtained from other sources than those of animal origin.

It is known that many micro-organisms have a lipase-activity. Lipolytic activity has been discovered, for example, in cultures of Serratia marcescens, Micrococcus freudenreichii, Pseudomonas hydrophylia, Achrombacter fischeri, Bacillus subtilis, and Bacillus cereus (cf. J. Appl. Bact. 25, (1), 72 (1962)), and the genera Aeromonas, cibrio, and clostridium, too, are reported to produce lipase. Up to now, however, attempts to make these micro-organisms useful lipase producers have failed because the yields are too unimportant to render a fermentative cultivation profitable. An increased yield is in many cases only obtained when special expensive nutrient media are used, which use precludes economical production. Moreover, many lipases have a limited field of applicability on account of their poor pH-stability. All these factors explain why the production of lipase up to now has not been developed on an industrial scale.

Now we have found that a lipolytically active enzyme can be obtained in a good yield by cultivating micro-organisms of the genus Pseudomonaceae, particularly Pseudomonas stutzeri L 130/11 (ATCC 19154) and Xanthomonas spec. L 85 (ATCC 19155), and their variants and mutants in a nutrient medium which contains, in addition to carbohydrate and nitrogen donors and fat, 0.0005 to 1%, preferably 0.01, to 0.1% of a carboxylic acid or sulfonic acid derivative, a xanthogenate or a free high molecular weight carboxylic acid or salts thereof, and by isolating the product from the culture filtrate by a method known per se.

The carboxylic acid and sulfuric acid derivatives as well as the higher molecular weight carboxylic acids are effective as inductors, i.e. as substances which start and specifically promote the enzyme synthesis. Particularly appropriate in this connection are carboxylic acid amides, preferably thioacetamide and thio-urea, as well as carbamic acid esters, such as ethyl or butyl urethane. As sulfonic acid derivatives there are mentioned in particular N-toluene sulfonylcarbamide acid methylester and toluene sulfonylmethyl amide. Suitable xanthogenates are for example potassium ethyl xanthogenate and potassium amylxanthogenate. It is also possible to use higher molecular weight fatty acids and salts thereof, for example stearic acid and sodium stearate, for the process of the present invention. The best results are obtained with thioacetamide, thiourea or toluene-sulfonylcarbamic acid methylester.

The other substances contained in the nutrient medium, for example carbohydrate and nitrogen sources, as well as fats, are generaly used for the fermentative cultivation of microorganisms. The fats may be of vegetable or animal origin; good results are also obtained with oils.

Since the fermentative cultivation, in particular in larger fermenters, is accompanied by considerable foam formation, it is recommended to add defoamers to the culture medium in concentrations up to 1%, preferably approximately 0.5%. The commercially available defoamer known as Mobilpar S® has proved particularly successful.

The fermentation is carried out in known manner and is in general complete after approximately 10 days. The culture solution contains the enzyme in quantities up to 300 International units (IU) per ml. The enzyme can be isolated from the culture solution in known manner, for example by precipitation with acetone or by lyophilisation. In its dry state the enzyme has an activity of 5–20 IU/mg. and is characterized by a high stability in aqueous solution at 50° C. Table 1 compares the properties of the product of the present process with those of native pancreatic lipase. The particular advantage of the product obtained according to the process of the present invention is the absence of traces of proteolytic enzymes which, for example, cause gradual decomposition in industrially prepared pancreatic enzymes. Another remarkable advantage is the improved capability of being activated by bile acids.

The lipase obtained according to the present invention can be used in veterinary medicine in crude form and in human medicine in purified form.

The following examples serve to illustrate the invention but they are not intended to limit it thereto.

EXAMPLE 1

Pseudomonas stutzeri L/130/11/ATC/19154 is inoculated on an inclined agar tube containing a nutrient medium of the following composition:

| | Percent |
|---|---|
| Ground soybeans | 0.5 |
| Cornsteep liquor | 0.5 |
| Glucose | 0.5 |
| Waste fat | 1.0 |
| Agar | 1.8 |

The inoculated tube is incubated for 3 days at 37° C. Thereupon the grown substance is washed off with 10 ml. of physiological NaCl-solution and this cell suspension is inoculated into a cultivation flask. 20 such cultivation tubes were used, which are sufficient for the inoculation of a wide-necked bottle of a capacity of 3000 ml. containing 1000 ml. of a nutrient solution of the following composition:

|  | Percent |
|---|---|
| Cornsteep liquor | 3.0 |
| Ground soybeans | 1.5 |
| Glucose | 0.5 |
| Waste fat | 0.75 |
| Thioacetamide | 0.05 |

The inoculation flask is shaken on a vibrating apparatus at 240 rotations per minute for 3 days at +28° C. Then 8 ml. each of this culture are inoculated into 60 300-ml. Erlenmeyer flasks, each one containing 35 ml. of the above nutrient solution (with 0.5% Mobilpar S ® as defoamer. These flasks constitute the main culture and are shaken at +28° C. and 220 rotations per minute on a vibrating apparatus for 3 to 5 days. Each day the lipase content of the culture solution is examined according to Desnuelle (cf. Arch. Biochem. Biophys. 83, 309 (1959)). For this purpose a sample is sharply centrifuged from the cells and the fatty acid set free from an olive oil emulsion is measured by electrometrical titration. One unit (IU) corresponds to the quantity of lipase which liberates one microequivalent of acid per minute at a pH of 8.2 (+37° C.). In this test the strain Pseudomonas L 130/11 yielded 175 IU/ml. of main culture after 5 days. From the centrifuged culture solution (610 ml.) 4.07 g. of dry substance of an activity of 20.8 IU/mg. are obtained after precipitation with the same volume of acetone.

EXAMPLE 2

Xanthomonas spec. L 85 ATCC 19155 is inoculated on an inclined agar tube which contains a culture medium of the following composition:

|  | Percent |
|---|---|
| Ground soybeans | 0.5 |
| Cornsteep liquor | 0.5 |
| Glucose | 0.5 |
| Toluene-sulfonylmethyl amide | 0.05 |
| Soybean oil | 1.0 |
| Agar | 1.8 |
| Water | Remainder |

This tube is incubated for 3 days at +37° C. Then the grown substance is washed off with 10 ml. of physiological NaCl-solution and 8 ml. thereof are inoculated into a 300 ml. Erlenmeyer flask containing 35 ml. of the following nutrient solution:

|  | Percent |
|---|---|
| Ground soybeans | 0.5 |
| Cornsteep liquor | 0.5 |
| Glucose | 0.5 |
| Toluene-sulfonylmethyl amide | 0.05 |
| Soybean oil | 1.0 |

To this pre-culture 0.5% of Mobilpar S ® as defoamer are added and the culture is shaken at 220 rotations per minute on a vibrating apparatus. 8 ml. thereof are then inoculated into 60 ml. of a main culture of the same composition as described above. The main culture is shaken for 5 days on the same vibrating apparatus. According to the Desnuelle test the culture solution yields 19 IU of lipase per ml.

EXAMPLE 3

A 5 liter fermenter is filled with 2 liters of a nutrient solution of the following composition:

|  | Percent |
|---|---|
| Cornsteep liquor | 3 |
| Soybean flour | 1.0 |
| Glucose | 1.5 |
| Emulsified waste fat | 0.5 |
| Thioacetamide | 0.05 |
| Water | Remainder | and sterilized for 30 minutes at 121° C. (1 atmospheric excess pressure). Before inoculating with Pseudomonas L 130, 0.5% of sterile Mobilpar S ® are added as defoamer. The vaccine is cultivated according to the method described in Example 1 and inoculated into the main culture so that the concentration of the inoculation material is 5%. The mixture is fermented at 30° C. for 3 days under aeration (100 liters per hour). The progress of the fermentation can be followed regularly. The lipase activity increases from 1.7 IU/ml. after 24 hours to 8.6 IU/ml. after 48 hours to 25.0 IU/ml. after 72 hours.

EXAMPLE 4

A fermenter fitted with stirrer, air inlet tube, connected devices for taking samples, automatic addition of defoamer, continuous supply of nutrient and automatic regulation of the solution level by pumping the solution into a collector, is filled with 4 liters of a nutrient solution of the following composition:

|  | Percent |
|---|---|
| Cornsteep liquor | 3 |
| Soybean flour | 1 |
| Glucose | 1 |
| Emulsified waste fat | 0.25 |
| Thioacetamide | 0.25 |
| Mobilpar S ® | 0.75 |
| Water | Remainder |

10 liters of a nutrient solution of the above composition, but containing 2% of glucose, are filled into a stock vessel. The two vessels are sterilized for one hour at 121° C. The fermentation vessel is then subsequently attached to the stock vessel by means of a hose via an adjustable pump and connected with a collector, cooled to 0° C., by means of a second hose via a pump controlled by a level electrode. During the continuous fermentation sterile silicone oil is added as defoamer, the addition of which is controlled by a second electrode. The inoculation is done with 100 ml. of Pseudomonas L 130 ATCC 19154 cultivated in the described manner. The fermentation is effected at 28° C. while stirring (300–450 rotations per minute) and aerating with 3.0–4.5 liters of air per minute. After 24 hours the continuous addition of the nutrient solution is started and adjusted in such a manner that 2.5 liters of fresh nutrient solution are added within 24 hours each. Samples give the following results:

| Hours | IU/ml. | pH |
|---|---|---|
| 20 |  | 6.8 |
| 24 | 9.7 | [1] 8.35 |
| 48 | 120– | 7.8 |
| 72 | 121– | 7.7 |
| 96 | 106– | 7.65 |
| 120 | 88– | 7.7 |
| 144 | 63– | 7.6 |
| 168 | 75– | 7.4 |
| 192 | 99– | 7.8 |
| 216 | 86– | 7.7 |

[1] Addition of nutrient solution started.

After 216 hours, 20 liters of culture suspension of an activity of 84 units/ml. are collected. After working up the centrifuged culture solution (16 l.) 61.7 g. of a lipolytically active enzyme are obtained having an activity of 10.7 IU/mg.

TABLE 1.—COMPARISON OF THE PROPERTIES OF LIPASE OBTAINED FROM PSEUDOMONAS L 130 AND OF PANCREATIC LIPASE

| | Average values of 6 batches under varying conditions | |
|---|---|---|
| | Lipase Pseudomonas (L 130) ATCC 19154 | Pancreatic lipase preparation |
| IU/mb | 5-20 | 35-45. |
| WU/g.[1] | 5-15 | 60. |
| Proteolytic activity: | | |
| Chymotrypsin (ATEE)[2][3] | 0 | 9.6 u./mg.[4] |
| Trypsin (BAEE) | 0 | 3.2 u./mg. |
| Increase of activity caused by Na-desoxycholate. | 6-10 times | 3 times. |
| pH optimum | 9-9.5 | Impure enzyme 8.9-9.1, purified enzyme 8.0-8.1. |
| Stability in water at 50° C. | After 5 hours 75% activity. | After 5 hours 35% activity. |
| pH dependence of stability in buffer at 50° C. | pH 5 to 8 after 5 hours 70% activity. pH 4 after 5 hours 5% activity. | |
| pH dependence of stability at room temperature. | pH 4 to 10 after 1 hour at room temperature 75 to 95% activity, unstable below pH 4. | |

[1] Willstätter unit/g. cf. Willstätter, Waldschmidt-Leitz, Nennen, Z. phys. Chemie 125, 93 (1923).
[2] Determined by measuring the cleavage of acetyltyrosine ethylester as substrate.
[3] Determined by measuring the cleavage of benzoylarginine ethylester as substrate.
[4] 1 unit = transformation of 1 micromol/minute at 37° C.

In the accompanying drawing:

FIG. 1 compares the stability of Pseudomonas lipase with pancreas lipase in water of 50° C., pH=6.9;

FIG. 2 gives the stability of Pseudomonas lipase in buffer solutions at 50° C.;

FIG. 3 shows the dependence on the pH value of the stability of Pseudomonas lipase at room temperature after one hour; and FIG. 4 shows the dependence on the pH value of the activity of Pseudomonas lipase.

We claim:

1. A process for the preparation of a lipolytically active enzyme by cultivating a microorganism selected from the group consisting of *Pseudomonas stutzeri* L 130/11 ATCC 19154, Xanthomonas spec. L 85 ATCC 19155, and mutants and variants thereof submerged in a nutrient medium comprising fat, carbohydrate, and nitrogen sources and 0.0005 to 1 percent of an additive selected from the group consisting of a carboxylic acid derivative, a sulfonic acid derivative, a xanthogenate, and a higher carboxylic acid, and then recovering said lipolytically active enzyme from the culture filtrate.

2. A process as in claim 1 wherein from 0.01 to 0.1 percent of said additive are present in said nutrient medium.

3. A process as in claim 1 wherein said carboxylic acid derivative is carboxylic acid amide.

4. A process as in claim 1 wherein said carboxylic acid derivative is thioacetamide or thiourea.

5. A process as in claim 1 wherein said sulfonic acid derivative is a sulfonylcarbamide acid derivative.

6. A process as in claim 1 wherein said sulfonic acid derivative is N-toluene-sulfonylcarbamide acid methyl ester or toluene-sulfonylmethyl amide.

7. A process as in claim 1 wherein, a foam-inhibiting agent is present in said nutrient medium.

8. A process as in claim 7 wherein said foam inhibiting agent is silicone oil or octyl alcohol.

9. A lipolytically active enzyme prepared according to claim 1 having lipolytic activity which is at an optimum at pH 9-9.5, which is increased in the presence of Na-desoxycholate, and which, with the enzyme in the dry state, is from 5-20 IU/mg.

References Cited

UNITED STATES PATENTS

| | | | |
|---|---|---|---|
| 2,888,385 | 5/1959 | Grandel | 195—67 |
| 3,186,919 | 6/1965 | Rupe | 195—66 |
| 3,189,529 | 6/1965 | Yamada et al. | 195—62 |
| 3,262,863 | 7/1966 | Fukumoto et al. | 195—66 |

OTHER REFERENCES

Alford et al., Journal of Lipid Research, vol. 5, pp. 390-394 (1964).

Mayne, Applied Microbiology, vol. 4, No. 5, pp. 270-273 (1956).

Arima et al., Agricultural & Biological Chemistry, vol. 30, pp. 515-516 (1966).

LIONEL M. SHAPIRO, Primary Examiner

U.S. Cl. X.R.

195—66, 114